(12) United States Patent
Matsuhisa et al.

(10) Patent No.: US 7,451,647 B2
(45) Date of Patent: Nov. 18, 2008

(54) MEMS SENSOR DRIVING DEVICE, MEMS SENSOR DRIVING METHOD, AND ACTIVE SENSOR USING MEMS

(75) Inventors: Kazuhiro Matsuhisa, Tokyo (JP); Koji Fukumoto, Kanagawa (JP); Masaya Nagata, Kanagawa (JP); Atsuhito Yasui, Kanagawa (JP)

(73) Assignee: Sony Corporation, Tokyo (JP)

( * ) Notice: Subject to any disclaimer, the term of this patent is extended or adjusted under 35 U.S.C. 154(b) by 60 days.

(21) Appl. No.: 11/539,743

(22) Filed: Oct. 9, 2006

(65) Prior Publication Data

US 2007/0089512 A1   Apr. 26, 2007

(30) Foreign Application Priority Data

Oct. 21, 2005   (JP)   ............................ P2005-306613

(51) Int. Cl.
*G01P 15/13*   (2006.01)
(52) U.S. Cl. ................................. 73/514.18; 73/514.21
(58) Field of Classification Search ............. 73/514.32, 73/514.17, 514.18, 514.21, 514.22, 514.23, 73/514.24, 514.16, 514.29, 504.12, 504.14
See application file for complete search history.

(56) References Cited

U.S. PATENT DOCUMENTS

| | | | | |
|---|---|---|---|---|
| 5,652,374 A | * | 7/1997 | Chia et al. ................... 73/1.38 |
| 5,777,226 A | * | 7/1998 | Ip ............................ 73/514.24 |
| 6,301,965 B1 | * | 10/2001 | Chu et al. ................ 73/514.18 |
| 6,311,555 B1 | * | 11/2001 | McCall et al. ................ 73/488 |
| 6,484,578 B2 | * | 11/2002 | Woodruff et al. ......... 73/514.29 |
| 6,722,197 B2 | * | 4/2004 | Knowles et al. .......... 73/504.12 |
| 6,789,029 B2 | * | 9/2004 | Rober .......................... 702/76 |
| 7,150,191 B2 | * | 12/2006 | Foote et al. .............. 73/514.29 |
| 7,275,433 B2 | * | 10/2007 | Caminada et al. ........ 73/514.18 |

OTHER PUBLICATIONS

Research for Gyroscopes and the Integration by Micromachining, 2000, p. 123-124.

* cited by examiner

Primary Examiner—Helen C. Kwok
(74) Attorney, Agent, or Firm—Sonnenschein Nath & Rosenthal LLP

(57) ABSTRACT

A MEMS sensor driving device drives a MEMS sensor including a supporter provided on a surface of a substrate, an elastic member having one end connected to the supporter, and an oscillator which is supported by another end of the elastic member in a suspended state over the surface of the substrate and which is displaceable for the substrate. The MEMS sensor driving device includes a detecting unit for detecting an oscillation of the oscillator, and a feedback unit for amplifying a signal representing the oscillation detected by the detecting unit and inputting the amplified signal as a driving signal to the MEMS sensor.

8 Claims, 8 Drawing Sheets

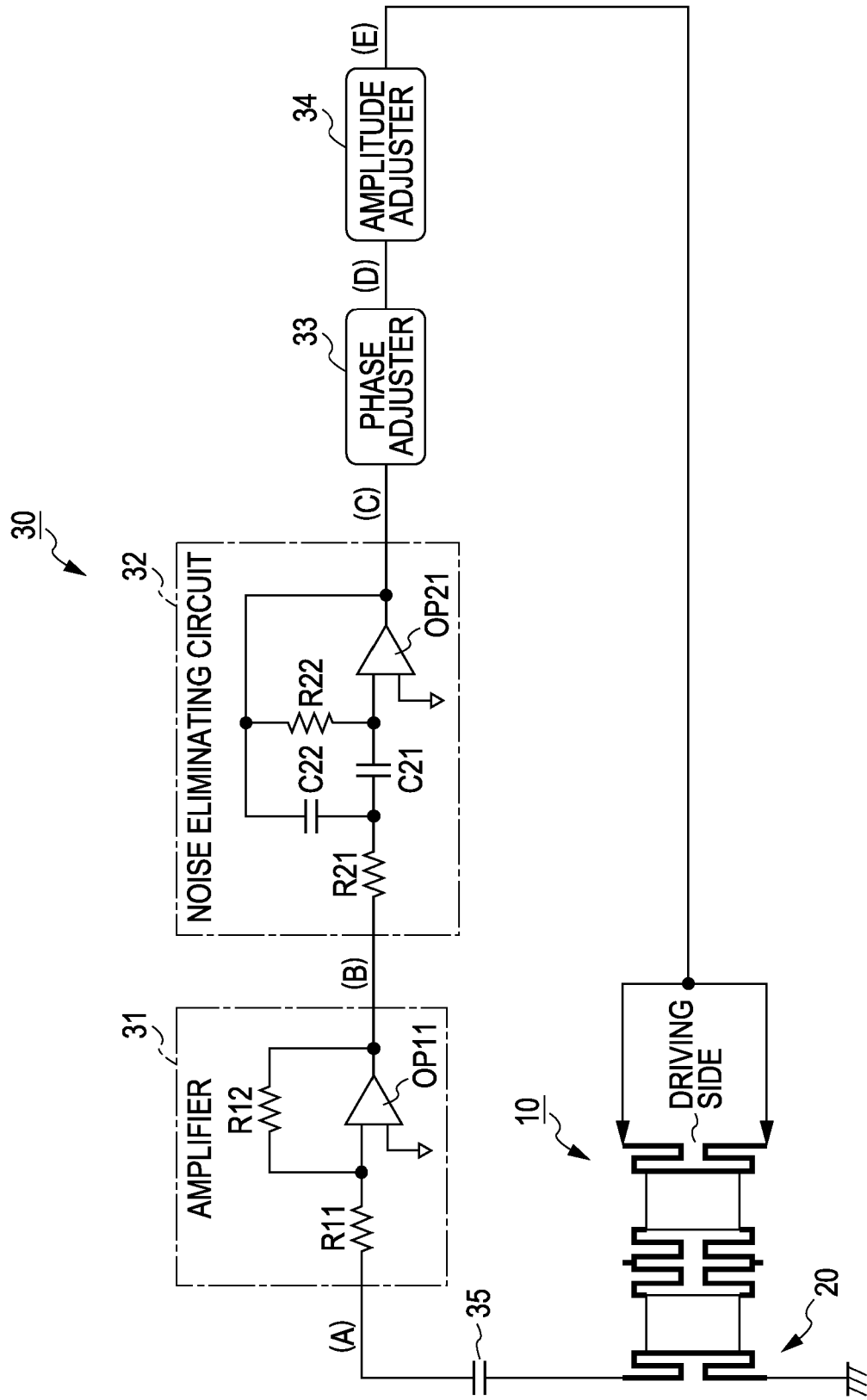

MEMS SENSOR DRIVING DEVICE, MEMS SENSOR DRIVING METHOD, AND ACTIVE SENSOR USING MEMS

CROSS REFERENCES TO RELATED APPLICATIONS

The present invention contains subject matter related to Japanese Patent Application JP 2005-306613 filed in the Japanese Patent Office on Oct. 21, 2005, the entire contents of which are incorporated herein by reference.

BACKGROUND OF THE INVENTION

1. Field of the Invention

The present invention relates to a microelectromechanical system (MEMS) sensor driving device, a MEMS driving method, and an active sensor using a MEMS.

2. Description of the Related Art

When an active sensor, such as an angular velocity sensor or an acceleration sensor, is formed by using a MEMS, it is necessary to drive an oscillator by using some force. In general, driving using an electrostatic force or the Lorentz force is known. In addition, by oscillating the oscillator at a resonance frequency based on a MEMS structure, a small force can produce large amplitude. Thus, it is common that the oscillator can be oscillated at a frequency in the vicinity of the resonance frequency of desired oscillation. In this case, in general, a configuration in which a resonance frequency is externally input is employed (see, for example, Takayuki FUJITA, "*Maikuromashiningu-niyoru Jairosukopu-to Sono-shusekika-nikansuru Kenkyu* (Study on Gyroscope based on Micromachining and Integration thereof)", Himeji Institute of Technology (in Japan), doctoral thesis for the year 2000, pp. 123-124)

SUMMARY OF THE INVENTION

However, in the configuration in which the resonance frequency is externally input, it is difficult to follow a change in resonant frequency for a variation of samples or a change in temperature. Thus, a problem occurs in that amplitude greatly changes due to an external environment or a variation of samples.

In addition, a MEMS frequently has oscillation in a non-linear region by using driving at a frequency in the vicinity of a spring elastic limit, a spring arcuate motion, or the like. However, when the MEMS is used at a frequency in the vicinity of a peak in frequency, a jump phenomenon occurs due to an effect such as disturbance, whereby the resonant frequency and amplitude of the MEMS change. Accordingly, it is difficult to obtain expected gain or the like. To restore a normal state of the MEMS, it is necessary to set detailed conditions such as a free-run frequency, a frequency-scanning direction, and a scanning speed. This complicates a driving circuit for the MEMS.

This is specifically described below. As shown in FIG. 9, when a hard spring is used in a MEMS, the MEMS has a hysteresis based on a frequency-scanning direction. When scanning is performed in a low-frequency-to-high-frequency direction, the hysteresis is represented by points A, B, C, and D in this order. When scanning is performed in a high-frequency-to-low-frequency direction, the hysteresis is represented by points D, C', B', and A in this order. In addition, as the scanning speed decreases, a peak indicated by point B moves to higher frequencies and higher gains. In the case of a soft spring, the characteristic shown in FIG. 9 is mirror-reversed.

When peak searching is performed in this state by using a phase-locked loop (PLL) circuit using a voltage-controlled oscillator (VCO) and using resonance at point B, which represents a high gain, it is necessary to appropriately set the following items:

- a scanning direction (in the case of a soft spring, a low-frequency-to-high-frequency direction);
- a loop-filter time constant (scanning speed) of the PLL circuit;
- a free-run frequency (sweep-start frequency); and
- a phase shift value for determining a lock phase.

According to an embodiment of the present invention, it is desirable to provide a MEMS sensor driving device and method, and a MEMS active sensor that perform stable driving in which a gain hardly changes even for a shift in resonant frequency for a change such as an externally environmental change such as a change in temperature.

According to an embodiment of the present invention, there is provided a MEMS sensor driving device for driving a microelectromechanical system sensor including a supporter provided on a surface of a substrate, an elastic member having one end connected to the supporter, and an oscillator supported by another end of the elastic member in a suspended state over the surface of the substrate, the oscillator being displaceable for the substrate, the MEMS sensor driving device including a detecting unit for detecting an oscillation of the oscillator, and a feedback unit for amplifying a signal representing the oscillation detected by the detecting unit and inputting the amplified signal as a driving signal to the microelectromechanical system sensor.

According to another embodiment of the present invention, there is provided a microelectromechanical system sensor driving method for driving a microelectromechanical system sensor including a supporter provided on a surface of a substrate, an elastic member having one end connected to the supporter, and an oscillator supported by another end of the elastic member in a suspended state over the surface of the substrate, the oscillator being displaceable for the substrate, the microelectromechanical system sensor driving method including the steps of detecting an oscillation of the oscillator, and amplifying a signal representing the detected oscillation and inputting the amplified signal as a driving signal to the microelectromechanical system sensor.

According to another embodiment of the present invention, there is provided an active sensor including a microelectromechanical system sensor including a supporter provided on a surface of a substrate, an elastic member having one end connected to the supporter, and an oscillator supported by another end of the elastic member in a suspended state over the surface of the substrate, the oscillator being displaceable for the substrate, and a driving unit for detecting an oscillation of the oscillator, amplifying a signal representing the detected oscillation, and inputting the amplified signal as a driving signal to the microelectromechanical system sensor.

In the MEMS sensor and the active sensor using the MEMS sensor, for driving the MEMS sensor, by detecting an oscillation of an oscillator of the MEMS sensor, amplifying a signal representing the detected oscillation, and feeding back the amplified signal as a driving signal to the MEMS sensor, the MEMS sensor can be self-oscillated. The MEMS sensor self-oscillates, whereby the MEMS sensor can follow a change in resonant frequency due to a disturbance such as a variation in process or a change in temperature.

According to an embodiment of the present invention, stable driving is realized in which a gain hardly changes even for a shift in resonant frequency for a change such as an externally environmental change such as a change in temperature.

BRIEF DESCRIPTION OF THE DRAWINGS

FIG. 3 is a block diagram showing the configuration of a MEMS sensor driving device according to a first embodiment of the present invention;

DESCRIPTION OF THE PREFERRED EMBODIMENTS

Embodiments of the present invention are fully described below with reference to the accompanying drawings.

MEMS Sensor

Figure 1:
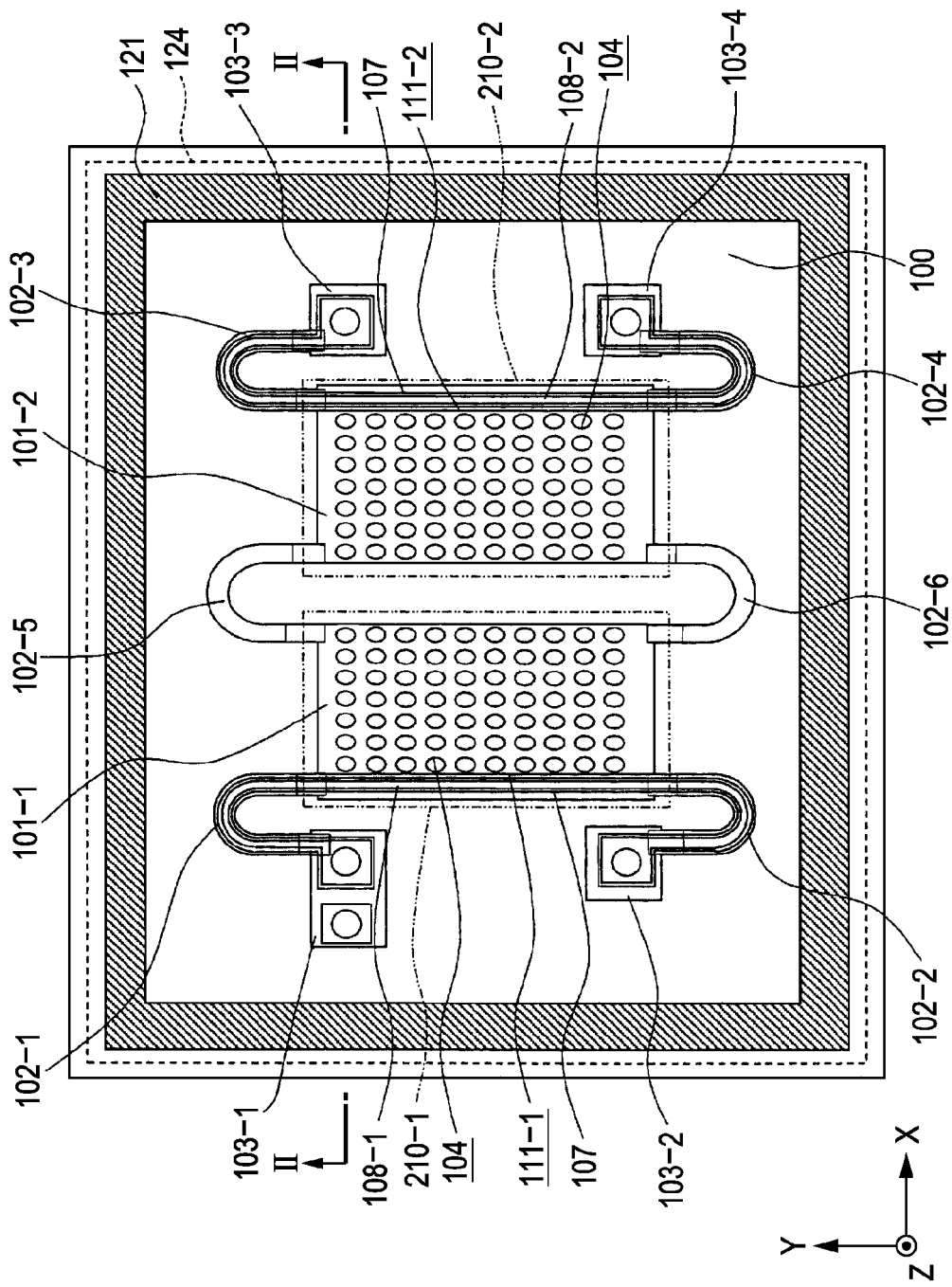
FIG. 1 is a plan view showing a basic structure of a MEMS sensor.
Figure 2:
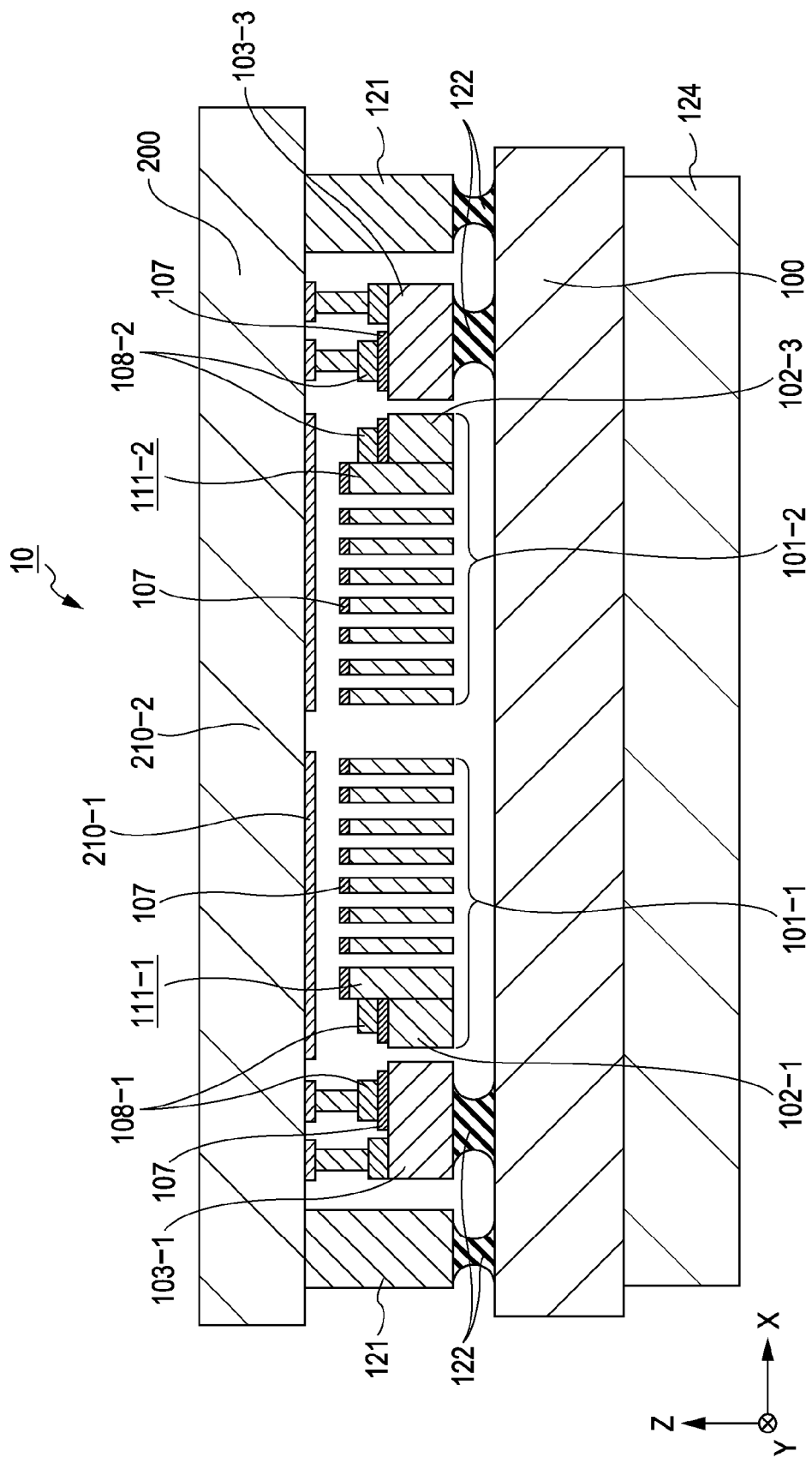
FIG. 2 is a sectional view taken on line II-II shown in FIG. 1.

First, a basic structure and operation principle of a MEMS sensor 10 to be driven by a driving device according to an embodiment of the present invention are described with reference to FIGS. 1 and 2. FIG. 1 is a plan view showing the basic structure of the MEMS sensor 10, and FIG. 2 is a sectional view taken on line II-II shown in FIG. 1. The sectional view in FIG. 2 differs in scale from the plan view in FIG. 1.

As shown in FIGS. 1 and 2, the MEMS sensor 10 includes a first oscillator 101-1 and a second oscillator 101-2 in parallel. The first and second oscillators 101-1 and 101-2 are formed by rectangular thin films. By way of example, the first and second oscillators 101-1 and 101-2 are formed by silicon layers. Opposing corners of the first and second oscillators 101-1 and 101-2 are combined by elastic supporters 102-5 and 102-6.

The first oscillator 101-1 is supported by one end of each of elastic supporters 102-1 and 102-2 at corners of the first oscillator 101-1 which are opposite the second oscillator 101-2. The other end of each of the elastic supporters 102-1 and 102-2 is fixedly supported by each of supporters 103-1 and 103-2. In addition, the second oscillator 101-2 is supported by one end of elastic supporters 102-3 and 102-4 at corners of the second oscillator 101-2 which are opposite the first oscillator 101-1. The other end of each of the elastic supporters 102-3 and 102-4 is fixedly supported by each of supporters 103-3 and 103-4.

The elastic supporters 102-1 to 102-4 are, for example, flat springs. The elastic supporters 102-1 to 102-4 are formed to be, for example, U-shaped by, for example, silicon layers. The supporters 103-1 to 103-4 are fixed to a first substrate 100, with an insulator 122 provided therebetween. Accordingly, the first oscillator 101-1 and the second oscillator 101-2 are supported only by the elastic supporters 102-1 to 102-4, with both completely suspended from the first substrate 100.

In the MEMS sensor 10 in this embodiment, electrode-formed surfaces of the elastic supporters 102-1 to 102-4 are lower than upper surfaces of the first oscillator 101-1 and the second oscillator 101-2 closer to the first substrate 100. The electrode-formed surfaces of the first oscillator 101-1 and the second oscillator 101-2 are formed on excavation portions 111-1 and 111-2 formed by excavating portions of the first oscillator 101-1 and the second oscillator 101-2.

For the excavation portion 111-1 of the first oscillator 101-1, a driving electrode 108-1 for electromagnetically driving the first oscillator 101-1 is provided, with an insulating film 107 provided therebetween, from the supporter 103-1 to the supporter 103-2 via the elastic supporter 102-1, the excavation portion 111-1 of the first oscillator 101-1, and the elastic supporter 102-2.

Similarly, for the excavation portion 111-2 of the second oscillator 101-2, a driving electrode 108-2 for electromagnetically driving the first oscillator 101-2 is provided, with the insulating film 107 provided therebetween, from the supporter 103-3 to the supporter 103-4 via the elastic supporter 102-3, the excavation portion 111-2 of the second oscillator 101-2, and the elastic supporter 102-4.

The driving electrode 108-1 is disposed at a position at which the direction of a force (the Lorentz force) generated by magnetic lines of force of a magnetic body 124 (described later) and a current (flowing perpendicularly to the plane of FIG. 1) flowing in the driving electrode 108-1 is coincident with the center of gravity of an oscillator system including the first oscillator 101-1 and the driving electrode 108-1.

Similarly, the driving electrode 108-2 is disposed at a position at which the direction of a force (the Lorentz force) generated by magnetic lines of force of the magnetic body 124 and a current (flowing perpendicularly to the plane of FIG. 1) flowing in the driving electrode 108-2 is coincident with the center of gravity of an oscillator system including the first oscillator 101-2 and the driving electrode 108-2.

In addition, the first oscillator 101-1 and the second oscillator 101-2 are provided with a plurality of through-holes 104 for lightening air dumping. The through-holes 104 operates to reduce a squeeze effect caused by a narrow gap between the first oscillator 101-1 and the second oscillator 101-2 and an above provided second substrate 200. Accordingly, it is preferable that the through-holes 104 be formed having uniform distribution so that the balance between the first oscillator 101-1 and the second oscillator 101-2 can be established. The second substrate 200 is described below.

The second substrate 200 is formed above the first substrate 100, with a frame 121 provided therebetween. The second substrate 200 is formed by, for example, a glass substrate. Counter electrodes (detection electrodes) 210-1 and 210-2 are formed at positions opposing the first oscillator 101-1 and the second oscillator 101-2 on a surface of the second substrate 200 opposing the first substrate 100.

In addition, a magnet 124 for electromagnetic driving is placed below the first substrate 100. The magnet 124 electromagnetically drives oscillator systems such as the first oscillator 101-1 and the second oscillator 101-2. Regarding placement of the magnet 124, for example, after excavating the first substrate 100, the magnet 124 may be placed. The magnet 124 may be placed on an upper surface of the second substrate 200, and may be placed on each of the first substrate 100 and the second substrate 200. In any case, the magnet 124 operates to provide a similar result although an output differs.

Next, regarding the operation principle of the MEMS sensor 10 having the above-described configuration, a case in which the MEMS sensor 10 is used as an angular velocity sensor is exemplified.

In the above-described MEMS sensor 10, a current having a period flows in the electrode 108-1. For example, it is assumed that current $I_1$ flows in the electrode 108-1 from an electrode pad 107-1 to an electrode pad 107-2. Then, current $I_2$ having a shift of 180 degrees flows in the electrode 108-2. Currents $I_1$ and $I_2$ have periods. Thus, currents $I_1$ and $I_2$ may flow in reverse directions at a different time. When the current flows in the electrode 108-1, Lorenz force $F_L$ is generated in an X-direction by a magnetic field from the magnet 124 below the first substrate 100.

Lorenz force $F_L$ is represented by the following expression and is induced in a direction orthogonal to a wiring.

$$F_L = IBL \tag{1}$$

where I represents a current flowing in the electrode 108-1 serving as a driving electrode, B represents a magnetic flux density, and L represents the length of the electrode 108-1.

Lorenz force $F_L$ is applied to the first oscillator 101-1 and the second oscillator 101-2 identically in period to the flowing currents $I_1$ and $I_2$. The first oscillator 101-1 repeats amplitude motion, using, as fixed points, the supporters 103-1 and 103-2 connected to the elastic supporters 102-1 and 102-2. The second oscillator 101-2 repeats amplitude motion, using, fixed points, the supporters 103-3 and 103-4 connected to the elastic supporters 102-3 and 102-4, and having a phase shift (for example, a phase shift of 180 degrees).

At the time, externally given an angular velocity around a Y-axis, Coriolis force $F_C$ is generated orthogonally to an oscillating direction. Coriolis force $F_C$ is represented by $$F_C = 2mv\Omega \tag{2}$$

where m represents the mass of an oscillator, v represents a velocity of oscillation in a direction of oscillation, and $\Omega$ represents an externally given angular velocity.

In order for a displacement generated by Coriolis force $F_C$ to be large, it is necessary to set large mass m and driving displacement Xm (Xm represents a corresponding parameter of velocity v of oscillation in a direction of oscillation). In the case of electromagnetic driving, a large displacement can be set because a displacement is not limited by an interdigital electrode necessary for electrostatic driving.

Generation of Coriolis force FC oscillates the first oscillator 101-1 and the second oscillator 101-2 in a Z-axial direction. Then, the capacitance between the detection electrode 210-1 on the second substrate 200 changes and the first oscillator 101-1, and the capacitance between the detection electrode 210-2 on the second substrate 200 and the second oscillator 101-2 changes. Here, by controlling the frequency of the applied voltage, one oscillator is inclined closer to the second substrate 200, while the other oscillator is inclined away from the second substrate 200. By detecting the difference in capacitance, the given angular velocity is calculated.

When angular velocity $\Omega$ is applied, there is a difference between a capacitance change generated in the detection electrode 210-1 and the first oscillator 101-1 and a capacitance change generated in the detection electrode 210-2 and the second oscillator 101-2. A translational acceleration is applied, there is no difference between both changes in capacitance. Thus, even if the difference between both changes in capacitance is used, there is no difference in capacitance change. Therefore, an acceleration component generated when an angular velocity is applied can be eliminated.

In addition, when Lorenz force $F_L$ is generated, an induced electromotive force is generated in the electrode 108-2 formed on the second oscillator 101-2. This induced electromotive force is generated having a period identical to that of Lorenz force $F_L$. For detecting a capacitance change, by allowing carrier waves to flow between the detection electrodes 210-1 and 210-2 and the first and second oscillators 101-1 and 101-2, and amplifying a current generated on the basis of a capacitance change, an actual signal is taken. By using synchronous detection to eliminate the carrier waves and, in addition, detecting driving waves with a periodic component of the induced electromotive force, a direct-current (DC) signal corresponding to the angular velocity can be taken.

Driving Device

Next, a driving device for driving the MEMS sensor 10 having the above-described configuration, that is, a MEMS sensor driving device according to an embodiment of the present invention, is described below.

First Embodiment

FIG. 3 is a block diagram showing the configuration of a MEMS sensor driving device (hereinafter referred to as a "MEMS driving device") according to the first embodiment of the present invention.

As shown in FIG. 3, the MEMS driving device according to the first embodiment includes a detecting unit 20 for detecting (monitoring) oscillation of oscillators (corresponding to the first and second oscillators 101-1 and 101-2 in FIGS. 1 and 2) of the MEMS sensor 10, and a feedback circuit 30 for amplifying a signal detected by the detecting unit 20 and inputting the amplified signal as a driving signal to the MEMS sensor 10.

As described above, the detecting unit 20 electromagnetically detects (monitors) the oscillation of the oscillators of the MEMS sensor 10. However, the detection principle of the detecting unit 20 is not limited to electromagnetic detection, but electrostatic detection, piezoelectric detection, or the like, may be used. In other words, any detection principle may be used if the oscillation of the oscillators of the MEMS sensor 10 can be detected on the basis of the detection principle.

The feedback circuit 30 includes an amplifier 31, a noise eliminating circuit 32, a phase adjuster 33, and an amplitude adjuster 34. A signal detected by the detecting unit 20 is input to the feedback circuit 30 through a DC cutoff capacitor 35. The detected signal passes through the DC cutoff capacitor 35, whereby a DC noise component included in a monitor signal in the detecting unit 20 is eliminated.

In the feedback circuit 30, the amplifier 31 includes, for example, a resistor R11 having one end connected to the DC cutoff capacitor 35, an operational amplifier OP11 having one input end connected to the other end of the resistor R11, and a resistor R12 connected between the other input end and output end of the operational amplifier OP11. The amplifier 31 has a gain corresponding to that obtained such that the MEMS sensor 10 performs electromechanical transduction twice, and can operate to raise the level of the signal detected by the detecting unit 20.

The noise eliminating circuit 32 includes, for example, a resistor R21 having one end connected to the output end (the output end of the operational amplifier OP11) of the amplifier 31, a capacitor C21 having one end connected to the other end of the resistor R21, an operational amplifier OP21 having one input end connected to the other end of the capacitor C21, a resistor R22 connected between one input end and output end of the operational amplifier OP21, and a capacitor C22 connected between the other end of the resistor R21 and the output end of the operational amplifier OP21.

The noise eliminating circuit 32 is, for example, a bandpass filter in which the vicinity of a resonant frequency in a desired mode of the MEMS sensor 10, that is, a range of resonant frequency±20% when, for example, Q-value=1, is used as a pass band. The noise eliminating circuit 32 prevents oscillation caused by an unnecessary frequency, such as incoming noise, by raising a signal-to-noise ratio by limiting the pass band of the output signal of the amplifier 31 and eliminating noise included in the signal.

The phase adjuster 33 adjusts an output signal from the noise eliminating circuit 32 including a phase component rotated when the output signal of the amplifier 31 passes through the noise eliminating circuit 32 so that the phase of the output signal of the noise eliminating circuit 32 matches a phase corresponding to a desired operation mode on driving and monitoring (detecting) sides of the MEMS sensor 10.

The amplitude adjuster 34 is a current-feedback amplitude adjuster, and performs sinusoidal wave amplitude adjustment on the output signal of the phase adjuster 33 by using a resistor, automatic gain control, or the like, to perform current limitation. The output signal of the amplitude adjuster 34 is input as a driving signal to the driving side of the MEMS sensor 10.

When the MEMS driving device having the above-described configuration is supplied with power, white noise (noise in which the intensity of a component included in a unit frequency range (1 Hz) is constant regardless of the frequency) is amplified and is fed back as a driving signal to the MEMS sensor 10, whereby self-oscillation starts at a desired resonant frequency in the MEMS sensor 10.

Figure 4A:
FIGS. 4A, 4B, 4C, 4D, and 4E are waveform charts showing the waveforms of signals at points of the MEMS sensor driving device.
Figure 4B:
Figure 4C:
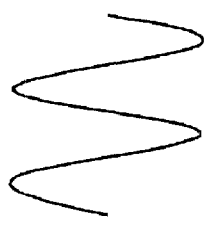
Figure 4D:
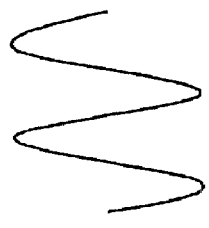
Figure 4E:

FIGS. 4A to 4E show signal waveforms at points (A) to (E) shown in FIG. 3. Specifically, FIG. 4A shows the waveform at point (A) of the input signal to the amplifier 31. FIG. 4B shows the waveform of the output signal from the amplifier 31, that is, the waveform at point (B) of the input signal to the noise eliminating circuit 32. FIG. 4C shows the waveform of the noise eliminating circuit 32, that is, the waveform at point (C) of the input signal to the phase adjuster 33. FIG. 4D shows the waveform of the output signal from the phase adjuster 33, that is, the waveform at point (D) of the input signal to the amplitude adjuster 34. FIG. 4E shows the waveform of the output signal from the amplitude adjuster 34, that is, the waveform at point (E) of the driving signal.

As is clear from the waveform chart of FIG. 4A, the signal detected by the detecting unit 20, that is, the input signal at point (A) to the amplifier 31, is weak in level, and this weak level signal is amplified by the amplifier 31. At this time, as is clear from the waveform at point (B) of the output signal from the amplifier 31, not only the level of the signal (S), but also the level of noise (N) is amplified.

The output signal at point (B) from the amplifier 31, which includes noise, passes through the bandpass filter included in the noise eliminating circuit 32, whereby the noise is eliminated and the noise-eliminated signal is output as a signal at point (C) having a good SN ratio. At this time, the output signal from the amplifier 31 passes through the noise eliminating circuit 32, whereby the output signal at point (C) from the noise eliminating circuit 32 is slightly shifted (rotated) for the input signal at point (B)

The output signal at point (C) from the noise eliminating circuit 32 including a phase component rotated when the output signal at point (B) from the amplifier 31 passes through the noise eliminating circuit 32 is processed so that the phase of the output signal from the noise eliminating circuit 32 matches a phase corresponding to a desired operation mode on the driving and monitoring (detecting) sides of the MEMS sensor 10 on the basis of phase adjustment of the amplitude adjuster 34. The phase-adjusted signal at point (D) is adjusted in amplitude by the amplitude adjuster 34. The amplitude-adjusted signal at point (E) is fed back as the driving signal to the driving side of the MEMS sensor 10.

Figure 5A:
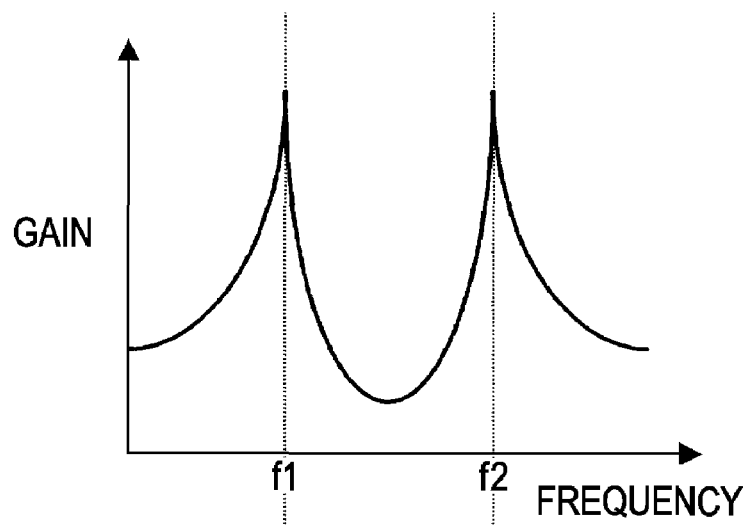
FIGS. 5A and 5B are graphs showing examples of frequency-to-gain and frequency-to-phase characteristic of the MEMS sensor, respectively.
Figure 5B:
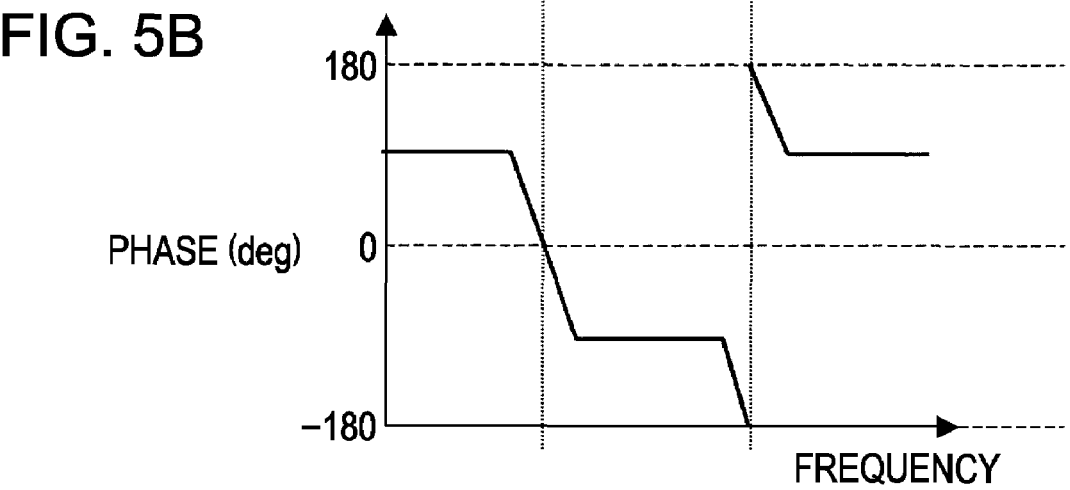

Here, examples of characteristics of the MEMS sensor 10 are shown in FIGS. 5A and 5B. FIG. 5A shows a frequency-gain characteristic of the MEMS sensor 10, and FIG. 5B shows a frequency-phase characteristic of the MEMS sensor 10. A case in which the MEMS sensor 10 has peak gains at two frequencies f1 and f2 is exemplified.

In the case of using the above MEMS sensor 10, by performing phase adjustment in the amplitude adjuster 34 so that, for the phase of the input signal at point (A) to the amplifier 31, the phase of the output signal at point (D) from the phase adjuster 33 advances, for example, 180 degrees, or lags, for example, 180 degrees, the MEMS sensor 10 self-oscillates in an operation mode in which the oscillators of the MEMS sensor 10 oscillate and frequency f2 in FIGS. 5A and 5B is used as a resonant frequency.

Obviously, by performing phase adjustment in the amplitude adjuster 34 so that the phase of the output signal at point (D) from the phase adjuster 33 is equal to the phase of the input signal at point (A) to the amplifier 31, the MEMS sensor 10 self-oscillates in an operation mode in which the oscillators of the MEMS sensor 10 oscillate and frequency f1 in FIGS. 5A and 5B is used as a resonant frequency.

As described above, for driving the MEMS sensor 10, oscillation of oscillators of the MEMS sensor 10 is detected and the detected signal is amplified and fed back as a driving signal to the MEMS sensor 10, whereby the MEMS sensor 10 can be self-oscillated. Thus, even for a shift in resonant frequency due to changes such as externally environmental changes such as a variation in process and a change in temperature, stable driving in which a gain hardly changes can be realized.

In particular, by performing phase adjustment in the phase adjuster 33, which is included in a feedback loop using the feedback circuit 30, locking to the resonant frequency of the MEMS sensor 10 on the basis of phase information can be performed. Thus, following a change in resonant frequency due to disturbance such as a variation in process or temperature, a variation in gain caused by deviation of a peak can be minimized even in a system having a relatively large Q-value. In addition, in the case of a MEMS sensor having a plurality of peak gains, an operation mode having a desired resonant frequency can arbitrarily be set by performing phase adjustment in the phase adjuster 33.

In addition, in nonlinear driving that allows oscillation in a nonlinear region by using driving in the vicinity of a spring elastic limit, a spring arcuate motion, or the like, locking to the resonant frequency of the MEMS sensor 10 is performed on the basis of phase information. Thus, stable driving is realized without being affected by a jump phenomenon or the like. In addition, the amplitude adjuster 34 adjusts the amplitude of the driving signal for the MEMS sensor 10, if necessary, thereby enabling compliance with various electromechanical transduction coefficients of the MEMS sensor 10. Furthermore, by appropriately setting a phase difference in each signal between the driving and monitoring (detecting) sides, driving in a desired driving mode can be performed.

Although, in the first embodiment, a bandpass filter is used as the noise eliminating circuit 32, it is not necessary to use the bandpass filter at all times, but one of a lowpass filter and a high-pass filter, or a combination of a lowpass filter, a high-pass filter, and a bandpass filter may be used.

In addition, if a frequency that becomes noise is known beforehand, a particular frequency component may be eliminated by using a notch filter. Furthermore, it is not necessary to use a filter as the noise eliminating circuit 32 at all times. Instead, by generating a signal that is reverse in phase to noise, mixing the signal after establishing impedance matching, and canceling the signal and the noise, the noise can be eliminated.

In addition, in the first embodiment, the phase adjuster 33 may ordinarily be formed by an all-pass filter having a gain of "1". However, when it is difficult to suppress filter phase rotation due to a variation in process or the like, a phase difference may be made constant by comparing the phases of a signal to be input to the noise eliminating circuit 32 and the output signal from the amplitude adjuster 34, and performing feedback so that phase inversion occurs.

In addition, although, in the first embodiment, the amplitude adjuster 34 uses automatic gain control to perform amplitude adjustment of sinusoidal waves, the amplitude adjustment is not limited to the use of automatic gain control. For example, by using a comparator, a Schmitt circuit (having a voltage hysteresis by a comparator and positive feedback), or the like, amplitude adjustment may be performed after the output signal from the phase adjuster 33 is shaped in square waves.

For amplitude adjustment of square waves, by using the Fourier series expansion, the amplitude adjustment is handled as superposition of F, 3F, 5F, . . . , where F represents a resonant frequency. Referring to the resonant frequency waveforms in FIGS. 4A to 4E, the gains of the third and subsequent harmonics are such small that can be ignored compared with the first harmonic. Thus, response similar to that in the case of amplitude adjustment of sinusoidal waves can be obtained. When the amplitudes of sinusoidal and square waves are set to be equivalent, the input energy of the latter is $4/\pi$ times that of the former. Thus, it is necessary to alter an automatic gain control coefficient or adjust the amplitude.

Modification

Figure 6:
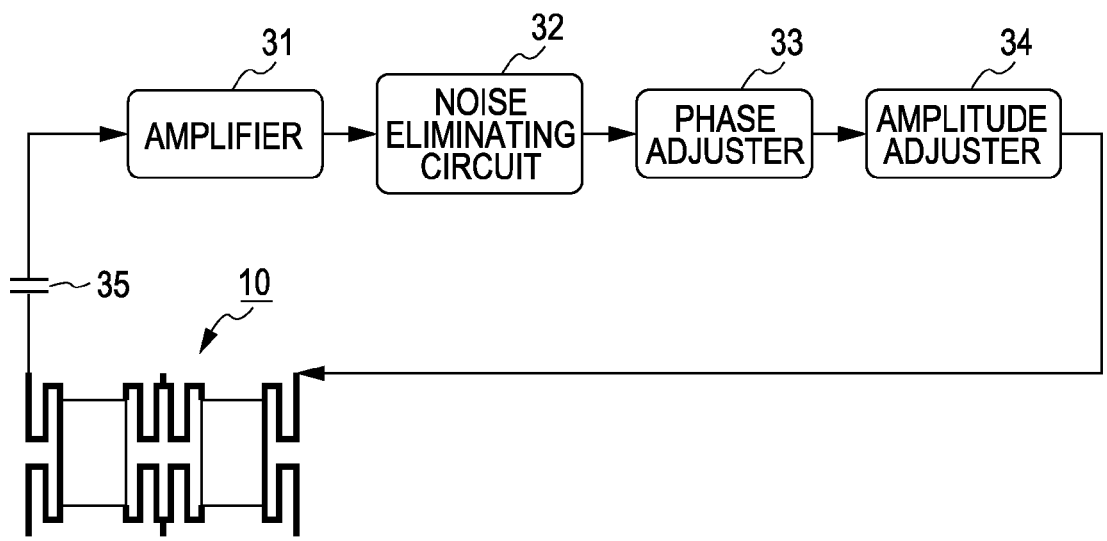
FIG. 6 is a block diagram showing the configuration of a driving device for driving a MEMS sensor including a single oscillator.

Although the first embodiment exemplifies driving of a MEMS sensor in which a plurality of oscillators, for example, two oscillators 101-1 and 101-2 are weakly combined by the elastic supporters 102-5 and 102-6, what is driven is not limited to such a MEMS sensor. For example, as shown in FIG. 6, even a MEMS sensor having a single oscillator can be self-oscillated by shifting the phase difference 180 degrees between the driving and monitoring sides. This case is unable to select a driving mode since there is only one driving mode for a translational axis.

Figure 7:
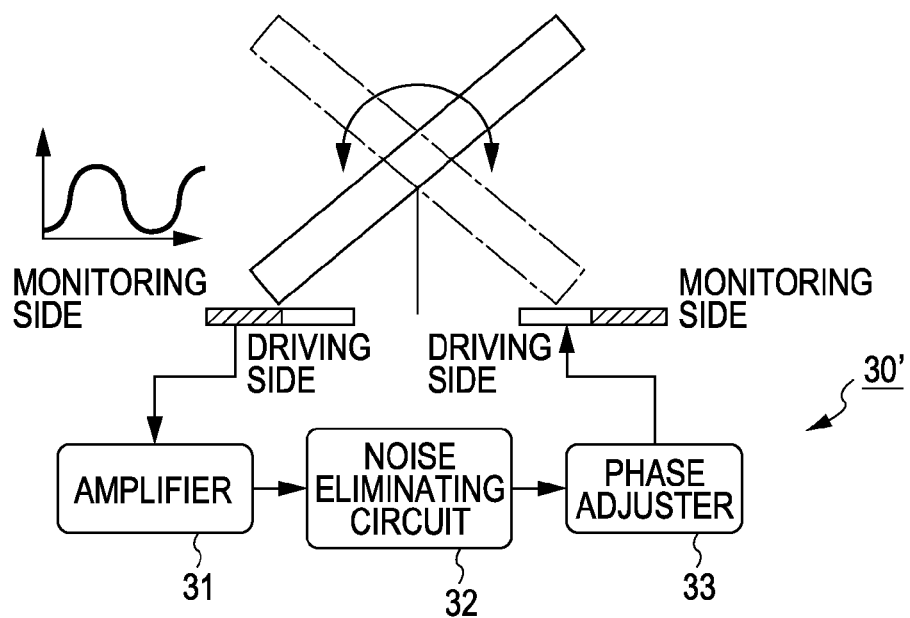
FIG. 7 is a block diagram showing the configuration of a driving device for driving a MEMS sensor used as an actuator.

In addition, as shown in FIG. 7, even in the case of driving a MEMS sensor suitable for use as an actuator such as an optical switch or a shutter, by providing the MEMS sensor with a detecting unit for detecting (monitoring) oscillation of oscillators of the MEMS sensor, and inputting a signal detected by the detecting unit as a driving signal to a driving side of the MEMS sensor through a feedback circuit 30' including, for example, an amplifier 31, a filter serving as a noise eliminating circuit 32, and a phase adjuster 33, the MEMS sensor can be driven by its self-oscillation.

Second Embodiment

Figure 8:
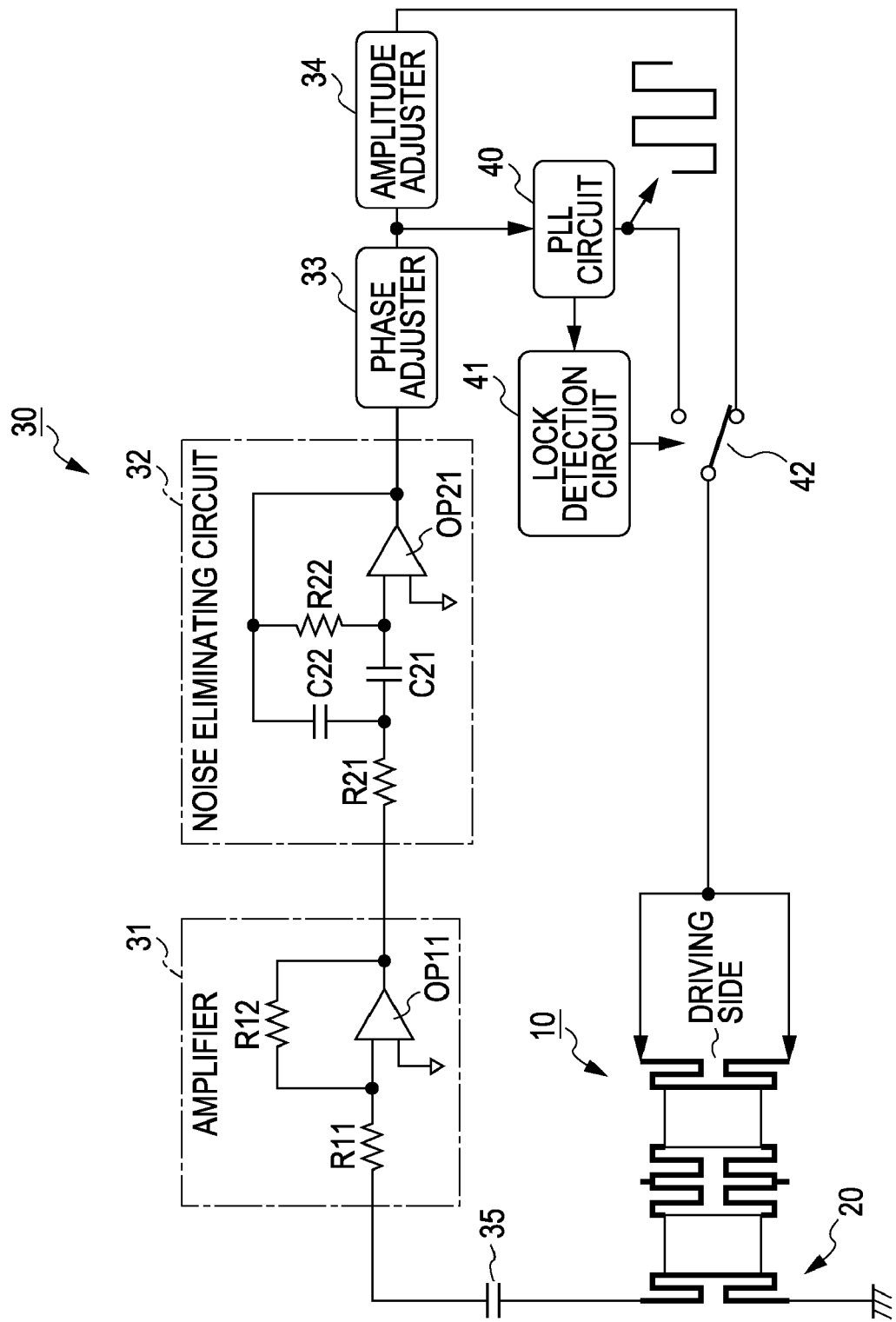
FIG. 8 is a block diagram showing the configuration of a MEMS sensor driving device according to a second embodiment of the present invention.
Figure 9:
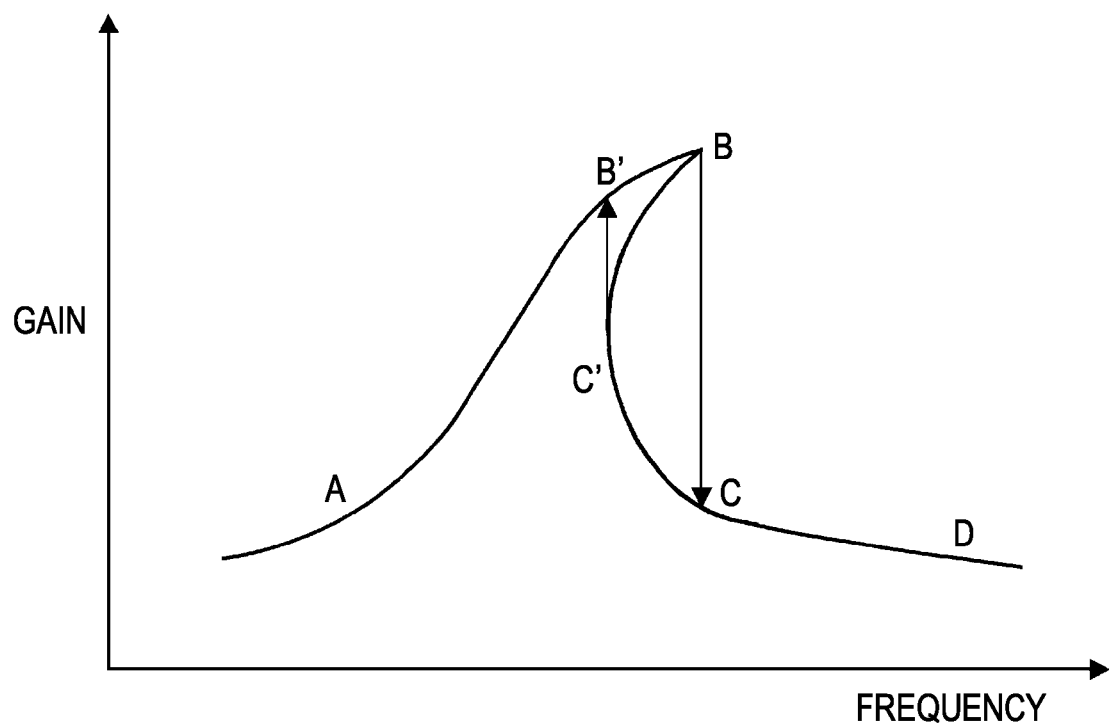
FIG. 9 is a graph illustrating a problem in the related art.

FIG. 8 is a block diagram showing the configuration of a MEMS driving device according to a second embodiment of the present invention. In FIG. 8, portions identical to those shown in FIG. 8 are denoted by identical reference numerals.

As shown in FIG. 8, the MEMS driving device has a configuration having a driving system using a PLL circuit 40 in addition to the driving system using the feedback circuit 30 in the MEMS driving device according to the first embodiment. In this configuration, when the MEMS sensor 10 is activated, the feedback circuit 30 is used to allow the MEMS sensor 10 to be in self-oscillating.

As is well-known, the PLL circuit 40 includes a VCO, a phase comparator, and a loop filter. The detecting unit 20 starts to operate on the basis of a signal detected by the detecting unit 20 in a state in which driving by the feedback circuit 30 allows the MEMS sensor 10 to self-oscillate.

Specifically, the feedback circuit 30 starts to operate using, as an input, for example, the output signal from the phase adjuster 33 when the MEMS sensor 10 is in self-oscillating, and generates a square wave signal having a frequency corresponding to the resonant frequency of the MEMS sensor 10. An input signal to the PLL circuit 40 when the MEMS sensor 10 is in self-oscillating is not limited to the output signal from the phase adjuster 33, but may be an output signal from the noise eliminating circuit 32.

When the PLL circuit 40 is locked, the locked state is detected by a lock detection circuit 41. The driving side of the MEMS sensor 10 has a selector switch 42 at an input end. The selector switch 42 has, as two inputs, the output signal from the feedback circuit 30 and the output signal from the PLL circuit 40, and is in selecting the output signal from the feedback circuit 30 until the PLL circuit 40 is locked. When the lock detection circuit 41 detects the locked state of the PLL circuit 40, the selector switch 42 selects an output signal from the PLL circuit 40 in response to an output representing the detection by the lock detection circuit 41, and inputs the selected signal as a driving signal to the MEMS sensor 10.

As described above, for driving the MEMS sensor 10, by first using driving by the feedback circuit 30 to self-oscillate the MEMS sensor 10, inputting the signal detected by the detecting unit 20 in this state to lock the PLL circuit 40, and switching driving by the feedback circuit 30 to driving (square wave driving) by the PLL circuit 40, in addition to the operation and advantages of the first embodiment obtained by the driving by the feedback circuit 30, noise and jitter components that remain after noise elimination by the noise eliminating circuit 32 can be eliminated by time constant adjustment of the PLL circuit 40. Thus, resonant driving having reduced noise is realized.

EXAMPLE APPLICATION

The MEMS sensor including the above-described MEMS sensor 10 is usable in, for example, an active sensor such as one of an angular acceleration sensor, an angular velocity sensor, and an angle sensor, or one of an acceleration sensor, a velocity sensor, a displacement sensor, and a jerk sensor. More specifically, the MEMS sensor including the above-described MEMS sensor 10 is usable in a sensor that needs reference oscillation, such as a gyroscope for measuring displacement by using the Coriolis force, or a sensor in which an increase in sensitivity is achieved by using reference oscillation and a carrier. The above-described MEMS driving devices according to the first and second embodiments are used with MEMS sensors and are suitable for use as driving devices for the MEMS sensors.

It should be understood by those skilled in the art that various modifications, combinations, sub-combinations and alterations may occur depending on design requirements and other factors insofar as they are within the scope of the appended claims or the equivalents thereof.

What is claimed is:

1. A microelectromechanical system sensor driving device for driving a microelectromechanical system sensor including an oscillator the microelectromechanical system sensor driving device comprising:
   a detecting unit for detecting an oscillation of the oscillator; and
   a feedback unit for amplifying a signal representing the oscillation detected by the detecting unit and inputting the amplified signal as a driving signal to the microelectromechanical system sensor,
   wherein,
   the microelectromechanical system sensor includes a supporter provided on a surface of a substrate, an elastic member having one end connected to the supporter, such that the oscillator is supported by another end of the elastic member in a suspended state over the surface of the substrate and displaceable relatively to the substrate, and a driving electrode connected to the supporter via the elastic member for electromagnetically driving the oscillator.

2. The microelectromechanical system sensor driving device according to claim 1, wherein the feedback unit includes:
   a noise eliminating unit for eliminating a noise component included in the amplified signal; and
   a phase adjusting unit for performing phase adjustment on a signal output from the noise eliminating unit.

3. The microelectromechanical system sensor driving device according to claim 1, wherein the feedback unit includes an amplitude adjusting unit for performing amplitude adjustment on the amplified signal.

4. The microelectromechanical system sensor driving device according to claim 1, further comprising:
   a phase-locked loop circuit whose operation is initiated on the basis of the signal representing the oscillation detected by the detecting unit in a state when driven by the feedback unit allows the microelectromechanical system sensor to self-oscillate,
   wherein,
   when the phase-locked loop circuit is locked, driving of the microelectromechanical system sensor is switched from driven by the feedback unit to driven by the phase-locked loop circuit.

5. A microelectromechanical system sensor driving method for driving a microelectromechanical system sensor including an oscillator, the microelectromechanical system sensor driving method comprising the steps of:
   detecting an oscillation of the oscillator; and
   amplifying a signal representing the detected oscillation and inputting the amplified signal as a driving signal to the microelectromechanical system sensors,
   wherein
   the microelectromechanical system sensor includes a supporter provided on a surface of a substrate, an elastic member having one end connected to the supporter, such that the oscillator is supported by another end of the elastic member in a suspended state over the surface of the substrate and displaceable relatively to the substrate, and a driving electrode connected to the supporter via the elastic member for electromagnetically driving the oscillator.

6. An active sensor comprising:
   a microelectromechanical system sensor including a supporter provided on a surface of a substrate, an elastic member having one end connected to the supporter, an oscillator supported by another end of the elastic member in a suspended state over the surface of the substrate, the oscillator being displaceable for the substrate, and a driving electrode connected to the supporter via the elastic member for electromagnetically driving the oscillator; and
   a driving unit for detecting an oscillation of the oscillator, amplifying a signal representing the detected oscillation, and inputting the amplified signal as a driving signal to the microelectromechanical system sensor.

7. A microelectromechanical system sensor driving device for driving a microelectromechanical system sensor including an oscillator, the microelectromechanical system sensor driving device comprising:
   a detecting unit detecting an oscillation of the oscillator; and
   a feedback unit performing amplification of a signal representing the oscillation detected by the detecting unit and input of the amplified signal as a driving signal to the microelectromechanical system sensors,
   wherein
   the microelectromechanical system sensor includes a supporter provided on a surface of a substrate, an elastic member having one end connected to the supporter, such that the oscillator is supported by another end of the elastic member in a suspended state over the surface of the substrate and displaceable relatively to the substrate, and a driving electrode connected to the supporter via the elastic member for electromagnetically driving the oscillator.

8. An active sensor comprising:
   a microelectromechanical system sensor including a supporter provided on a surface of a substrate, an elastic member having one end connected to the supporter, an oscillator supported by another end of the elastic member in a suspended state over the surface of the substrate, the oscillator being displaceable for the substrate, and a driving electrode connected to the supporter via the elastic member for electromagnetically driving the oscillator; and
   a driving unit performing detection of an oscillation of the oscillator, amplification of a signal representing the detected oscillation, and input of the amplified signal as a driving signal to the microelectromechanical system sensor.

* * * * *